(12) United States Patent
Gormley et al.

(10) Patent No.: US 7,388,209 B1
(45) Date of Patent: Jun. 17, 2008

(54) TARGET DENSITY IMAGING USING DISCRETE PHOTON COUNTING TO PRODUCE HIGH-RESOLUTION RADIOGRAPHIC IMAGES

(75) Inventors: Jerome E. Gormley, San Diego, CA (US); Hector Camacho, Temecula, CA (US); Frank H. Cardone, Encinitas, CA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 11/635,615

(22) Filed: Dec. 8, 2006

Related U.S. Application Data

(63) Continuation of application No. 10/856,942, filed on Jun. 1, 2004, now Pat. No. 7,166,844.

(51) Int. Cl.
*G01T 1/20* (2006.01)
*G01T 1/208* (2006.01)

(52) U.S. Cl. ............................ 250/370.11; 250/363.03; 250/363.04

(58) Field of Classification Search ............. 250/358.1, 250/363.03, 363.04, 370.11
See application file for complete search history.

(56) References Cited

U.S. PATENT DOCUMENTS

| | | | |
|---|---|---|---|
| 4,394,576 A | 7/1983 | Tanaka et al. | 250/366 |
| 4,531,058 A | 7/1985 | Burnham et al. | 250/363.03 |
| 4,743,764 A | 5/1988 | Casey et al. | 250/363.03 |
| 4,749,863 A | 6/1988 | Casey et al. | 250/363.03 |
| 4,750,972 A | 6/1988 | Casey et al. | 216/24 |
| 5,091,650 A | 2/1992 | Uchida et al. | 250/366 |
| 5,210,420 A | 5/1993 | Hartz et al. | 250/363.03 |
| 5,300,782 A | 4/1994 | Johnston et al. | 250/363.03 |
| 5,453,623 A | 9/1995 | Wong et al. | 250/363.03 |
| 5,585,603 A | 12/1996 | Vogeley, Jr. | 177/25.13 |
| 5,986,266 A | 11/1999 | Andreaco et al. | 250/363.09 |
| 6,255,654 B1 | 7/2001 | Verbinski et al. | 250/358.1 |
| 6,507,025 B1 | 1/2003 | Verbinski et al. | 250/358.1 |
| 6,552,346 B2 | 4/2003 | Verbinski et al. | 250/358.1 |
| 6,605,809 B1 | 8/2003 | Engels et al. | 250/394 |
| 2005/0031293 A1 | 2/2005 | Kim et al. | 385/146 |

FOREIGN PATENT DOCUMENTS

| | | |
|---|---|---|
| JP | 58-216974 | 12/1983 |
| JP | 62-129776 | 6/1987 |
| JP | 62-135787 | 6/1987 |

OTHER PUBLICATIONS

Casey, M. E., and Nutt, R., "A Multicrystal Two-Dimensional BGO Detector System for Positron Emission Tomography," *Trans. Nucl. Sci.*, vol. 33, No. 1, pp. 460-463, 1986.

(Continued)

*Primary Examiner*—David P. Porta
*Assistant Examiner*—Casey Bryant
(74) *Attorney, Agent, or Firm*—King & Spalding LLP

(57) ABSTRACT

The present invention relates to a system and method for using discrete photon counting to produce transmission radiographic images of a target object with improved spatial resolution and high system sensitivity. The system comprises a radiation source for directing photons at a target object and a detector array for receiving photons passing through the target in order to provide an image of the target density. The detector array is configured to enhance spatial resolution and maintain high system sensitivity. To correct the parallax effect that may be induced by such configuration of the detector array, a process can be computer implemented or program coded to parallax correction.

11 Claims, 6 Drawing Sheets

OTHER PUBLICATIONS

Roney, J. M. and Thompson, C.J. "Detector Identification with Four BGO Crystals on a Dual PMT," *Trans. Nucl. Sci.*, vol. NS-31, No. 5, pp. 1022-1027, Oct. 1984.

Derenzo, S. E., Budinger, T. F. and Vuletich, T., "High Resolution Positron Emission Tomography Using Small Bismuth Germanate Crystals and Individual Photosensors," *Trans. Nucl. Sci.*, vol. NS-30, No. 1, pp. 665-670, Feb. 1983.

Derenzo, S. E., et al., "Imaging Properties of a Positron Tomograph with 280 BGO Crystals," *Trans. Nucl. Sci.*, vol. NS-28, No. 1, pp. 81-89, Feb. 1981.

TARGET DENSITY IMAGING USING DISCRETE PHOTON COUNTING TO PRODUCE HIGH-RESOLUTION RADIOGRAPHIC IMAGES

CROSS-REFERENCE TO RELATED PATENTS AND APPLICATIONS

This application is a continuation of, claims priority to, and incorporates by reference in its entirety, U.S. patent application Ser. No. 10/856,942 entitled "TARGET DENSITY IMAGING USING DISCRETE PHOTON COUNTING TO PRODUCE HIGH-RESOLUTION RADIOGRAPHIC IMAGES," filed Jun. 1, 2004, now U.S. Pat. No. 7,166,844, which relates to and incorporates by reference in its entirety, U.S. Pat. No. 6,507,025, entitled, "DENSITY DETECTION USING REAL TIME DISCRETE PHOTON COUNTING FOR FAST MOVING TARGETS," issued Jan. 14, 2003.

This application is also related to U.S. patent application Ser. No. 10/717,632, entitled, "SYSTEM AND METHOD FOR TARGET INSPECTION USING DISCRETE PHOTON COUNTING AND NEUTRON DETECTION," filed Nov. 21, 2003, by Verbinski et al.; U.S. patent application Ser. No. 10/833,131 entitled, "DENSITY DETECTION USING REAL TIME DISCRETE PHOTON COUNTING FOR FAST MOVING TARGETS," filed Apr. 28, 2004, by Verbinski et al., which is a continuation of U.S. patent application Ser. No. 09/925,009, entitled, "DENSITY DETECTION USING REAL TIME DISCRETE PHOTON COUNTING FOR FAST MOVING TARGETS," filed Aug. 9, 2001, by Verbinski et al.; all of the aforementioned patent applications are also incorporated herein by reference in their entireties.

BACKGROUND OF THE INVENTION

1. Field of the Invention

The present invention relates to target density detection using discrete photon counting. More particularly, the present invention relates to using discrete photon counting to produce transmission radiographic images of a target object with improved spatial resolution and high system sensitivity.

2. Background

There are many instances in the security or customs field when it is necessary to examine or inspect in a non-destructive way, the contents of a target object, such as a closed package, box, suitcase, cargo container, automobile semi-trailer, tanker truck, railroad car, e.g., box car or tanker car, or the like. For example, customs departments are routinely charged with the responsibility of inspecting vehicles coming into a country to make sure such packages do not contain drugs or other contraband, or leaving the country with stolen automobiles, drug money, and other illicit contraband. Similarly, drug smugglers frequently carry out their criminal acts by hiding illegal drugs in vehicles such as tanker trucks, and then sending the trucks through a border checkpoint. When security personnel encounter suspicious vehicles or other containers being transported over international boundaries, they must perform a careful time consuming (~½ hour) inspection of such vehicles to ascertain their contents. Similarly, when suspicious trucks or cars enter compounds overseas having U.S. troops or containing embassy offices, they must be inspected for hidden vehicle bombs, poisonous gases, etc.

When suspicious vehicles are discovered, they generally must be examined or inspected on location in what is referred to as a "secondary inspection area." If secondary inspection reveals the presence of contraband (e.g., drugs), then the vehicle may be impounded, the driver arrested, and the contraband disposed of. If, on the other hand, the examination reveals the absence of contraband, then the vehicle may be allowed to proceed in normal manner.

SUMMARY OF THE INVENTION

The process used to examine or inspect a suspicious vehicle should be quick, simple, as unintrusive as possible and fast enough so as to not impede the "flow of commerce" or other traffic. Unfortunately, most common conventional inspection mechanisms require either visual inspection by others and/or scent inspection by dogs. These conventional inspection methods require that the vehicle stop and wait for the inspection to be completed, which can take a half hour or more. This is both inconvenient and time consuming for both customs officials and the vehicle drivers and occupants, and severely limits the number of vehicles that can be inspected each day. Furthermore, such inspection may put officers at personal risk if a vehicle has been booby-trapped or if the vehicle's driver or other occupants become nervous and decide to attack the customs officer inspecting their vehicle. What is needed, therefore, is a rapid, non-invasive technique for inspecting the contents of a suspicious vehicle without requiring that the vehicle be stopped and manually inspected.

A further problem posed by manual inspection techniques arises when tanker trucks or railroad cars, after having been emptied, seek to cross a border in order to refill. Because some such tankers (e.g., liquefied petroleum gas tankers that are of thick, double-walled steel construction) cannot be completely emptied without releasing the pressure in such tankers and venting noxious (and explosive) gasses into the atmosphere, the tankers typically are kept nominally under pressure. (The venting of noxious gasses would be hazardous and ecologically unacceptable.) Thus, the contents of such tankers typically go uninspected by customs agents in order to avoid the time-consuming (up to 3 days, with nitrogen purging) venting of such gases. Unfortunately, drug smugglers are well aware of this fact, and therefore utilize tanker trucks and railroad cars to import illegal drugs, knowing that they will not be inspected at the border. This venting condition provides just one of numerous additional examples of cases where invasive or intrusive inspection into vehicles, or other containers, is not feasible or desirable. Thus, this venting condition further emphasizes the need for a non-intrusive approach to vehicle inspection, especially by a high-energy gamma-ray radiographic system that easily penetrates the steel walled tanker.

Yet a further problem with prior vehicle inspection systems is that some, employing complex x-ray inspection sources, move a vehicle past a source and detector, which constitute heavy equipment subject to frequent breakdowns, and requiring very high capital costs for installation. Some inspect at a rate as low as 10-15 minutes per cargo vehicle, according to U.S. Customs Inspectors.

Additionally, some prior systems employing a high intensity standard X-ray radiation source require, at the beginning of the day, from one-half hour to 1 hour to warm up, depending upon the intervals between use. The X-ray source is expensive to buy and to install and requires an appreciable amount of power to operate, is sensitive to ambient humidity and motion-shock and is expensive and time-consuming to repair. Furthermore, these expensive X-ray sources frequently require a permanent shielding structure, which, along with the vehicle-moving mechanism, boosts the capital costs to nearly $10,000,000 for one such system, limiting the numbers which can be in use at borders. Costs can be lowered by operating conventional X-ray sources at low power to reduce shielding; however, low-power X-ray sources may not provide sufficient scanning and detection capabilities.

Therefore, there exists a need in the industry of cargo-vehicle inspection systems for a vehicle inspection system capable of detecting contraband on the order of a pound (or better) in a large, fast-moving vehicle in a manner which can be done swiftly so as not to hold up vehicle-traffic at border inspection points, and affordably, even with a fast-moving, large, accelerating vehicle, accelerating at an unpredictable rate.

The present invention advantageously addresses at least the above needs 1 and other needs by building upon the discrete photon counting approach described in the above-referenced patents to produce and transmit radiographic images of targets with improved spatial resolution and high system sensitivity.

Accordingly, in one embodiment, there is provided a system for imaging a target comprising: a radiation source configured to direct radiation at the target; a detector array configured to detect at least a portion of the radiation from the radiation source that passes through the target, the detector array includes at least one block detector having a two-dimensional sub-array of discrete detectors; and a first controller configured to receive data relating to the detected radiation and to generate a density image of the target that is corrected for a parallax effect.

In another embodiment, there is provided a method for imaging a target comprising: directing radiation at a target; detecting at least a portion of the radiation that passes through the target, the at least a portion of the radiation is detected by a detector array having at least one block detector, the at least one block detector includes a two-dimensional sub-array of discrete detectors; receiving data relating to the radiation detected by the detector array; and adjusting for a parallax effect in the density image of the target that results from a configuration of the detector array.

BRIEF DESCRIPTION OF THE DRAWINGS

The preferred embodiments are illustrated by way of example and not limited in the following figure(s), in which.

DETAILED DESCRIPTION OF THE INVENTION

Reference is now made in detail to embodiments of the present invention, some examples of which are illustrated in the accompanying drawings, in which like numerals indicate like elements, showing a method and system for target density imaging using discrete photon counting to produce improved spatial resolution radiographic images and maintain high system sensitivity.

Figure 1:
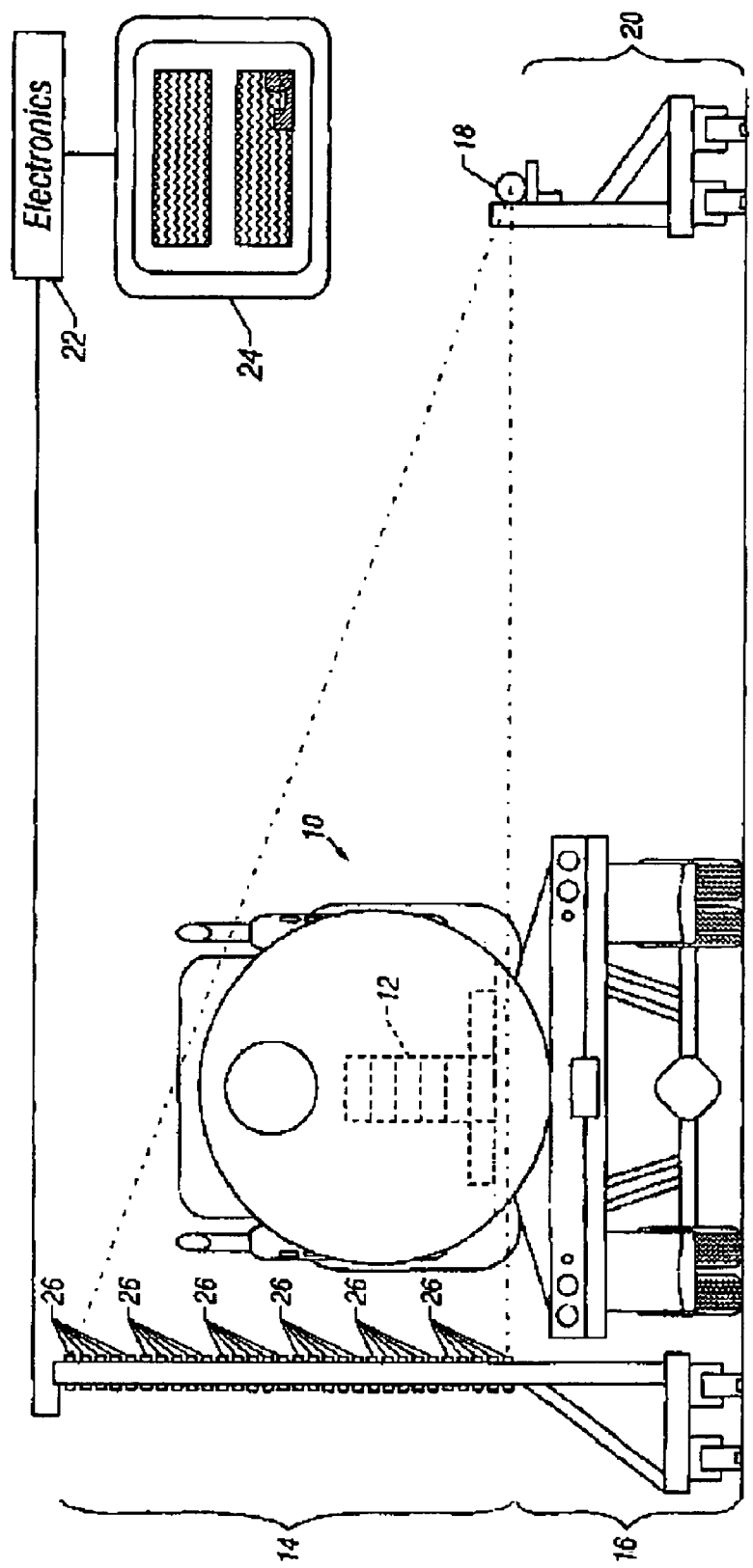
FIG. 1 depicts a schematic diagram of a system made in accordance with one embodiment of the present invention and of a tanker truck containing contraband material, wherein discrete photon counting is used to perform density measurements in a tanker truck and wherein an image is generated of the contents of such tanker truck in response thereto.

Referring first to FIG. 1, a schematic diagram is shown of a system made in accordance with one embodiment of the present invention and of a tanker truck containing contraband material, wherein discrete photon counting is used to perform density measurements in the tanker truck and wherein an image is generated of the contents of such tanker truck in response thereto.

Shown are the tanker truck 10, concealed contraband 12, a gamma-ray detector array 14, a detector array truck 16, a radiation source 18, a radiation source truck 20, processing electronics 22 and a graphical display device 24. It should be noted that all of the processing electronics 22 can be stored in a single detector housing or such electronics 22 can be stored both internally and externally to the detector housing as needed or desired.

The very low dose-rate gamma-ray field useable with the gamma-ray detector array 14 is low enough in intensity to allow operating personnel to work within it, when a shutter (not shown) of the radiation source holder 18 is in the closed position. In the illustrated embodiment the shutter is opened only when an image is being generated, the system is being calibrated (normalized) or for troubleshooting purposes by approved personnel, preferable after all personnel leave an area swept out by a fan beam of the radiation source 18. For example, the very low dose-rate gamma-ray field may use 662 keV gamma-ray energy. However, a stronger gamma-ray or x-ray source of any other photon energy than this can be used in the interest of faster density measurements, while still allowing operating personnel to work within the very low dose-rate field. Such can be used for example when the vehicle under inspection is traveling at high speeds, e.g., railroad freight car, and when the shutter is opened, e.g., after a truck driver or train engineer has passed.

The radiation source 18 is preferably a 1, 1.6 or 2.0 Curie shuttered monoenergetic source of Cs-137 gamma-rays (662 keV gamma-ray energy). Alternatively, a Co-60 source may be used which emits photons at 2 energy levels, in particular, about 1170 and 1339 keV. A monoenergetic or near mono-energetic source is preferable, however, because energy-level filtering of the "softer component" (as in X-rays) can be eliminated. A suitable set of source holders are readily available as Model No. SH-F-2, SH-F-3 and SH-F-4 from Ohmart Corporation of Ohio. The radiation source holder may include a built-in shutter collimator that provides a 45° to 60° vertical opening (measured from horizontal upwards) and a 10° lateral opening resulting in a narrow fan beam, utilizing a post-collimator that makes the beam sufficiently wide to irradiate the detector stack. In the absence of the built-in shutter collimator, an external collimator is attached to the front of the source holder in order to achieve the desired beam geometry. The source holder shutter may be electrically actuated. An additional shutter, external to the source holder, can be added to facilitate faster opening/closing times as well as redundant operation to meet government's safety requirements.

The gamma-rays source 18 emits photons that are of high enough energy levels (e.g., 662 keV) to penetrate steel walls and are only moderately attenuated by steel walls typically found in tanker trucks or railroad cars. Yet such rays are sufficiently attenuated by contraband packages to make them easily detectable by measuring the penetration of the photons emitted from the source 18 and deriving relative material densities therefrom. In addition, there is negligible backscattering of the gamma-ray energy from the tanker walls, much less than would occur if a high-powered x-ray source was utilized. Although, an x-ray source may be desirable for high speed inspection applications or for inspection of unmanned vehicles.

In an embodiment of the present invention, the narrow fan beam is adjustable by aiming the source holder, so as to cover different cargo heights and distances from the detector array, while maintaining full irradiation of the detector array. Consequently, in this embodiment, the radiation source holder is mounted so as to be movable. Further, in order to maintain full irradiation of the lowest detector without irradiating the ground and causing excessive back scatter, the radiation source collimation is adjusted so as to point just a few inches below the lowest detector. In this way, ground scattering background is greatly reduced, resulting in improved image crispness and depth of penetration.

Based on model analyses and calculations, the inventors have determined that high system sensitivity requires spreading the detector mass across a broad width. Furthermore, the inventors have determined that smaller detector pixel sizes, e.g., optimal at 4-8 mm, improve spatial resolution. FIGS. 2A-C depict the detector array 14 based on the aforementioned analyses and calculations, in accordance with an embodiment of the present invention. As shown in FIG. 2A, the detector array 14 employs an assembly of detector modules 200 which are regularly stacked, but not limited, in a vertical or horizontal orientation. As shown in FIG. 2B, each detector module 200 comprises a plurality of gamma-ray block detectors 220, e.g., 16 block detectors, arranged in a modular housing. As shown in FIG. 2C, each block detector 220 comprises an array 240 of pixels 242, one or more light pipes or guides (not shown) guiding light from the pixels 242 to the photomultiplier tubes (PMTs) 260, and associated circuitry in, e.g., an electronics sled 280 built into a single, modular device. The pixels 242 in the array 240 are scintillation-type detectors, such as scintillation crystals, that absorb gamma rays from the radiation source 18 and emits photons that are detected by the PMTs 260. The crystals can be made of bismuth germanate oxide (BGO) or other suitable materials known in the art.

The number of block detectors to be used depends on the height or width of the target to be scanned. For example, there are 64 block detectors in the detector array 14, which are divided into 4 detector modules, each comprising 16 block detectors.

FIG. 2C depicts a block detector 220 as the smallest field-replaceable assembly in the detector array 14, in accordance with an embodiment of the present invention. The pixels 242 may be arranged in a regular rectangular array 240 of 8×8 pixels. As mentioned earlier, it has been determined that the optimal detector pixel size for improved spatial resolution is preferably 4-8 mm. This size represents a balance between improved spatial resolution and reduced image contrast due to pixel out-scattering. Thus, according to one embodiment of the present invention, each detector pixel 242 is approximately 6 mm×6 mm×30 mm. The depth can be a value other than 30 mm and represents a trade-off between system sensitivity (with more depth) and image contrast (with less depth), as understood in the art.

In the embodiment shown, there are four PMTs 260 (designated by A, B, C, D) with four outputs for each pixel array 240 in a block detector 220. Each PMT receives photons from all pixels 242 in the pixel array 240. The number of PMTs can be any value as desired based on design parameters, such as practicality and field reliability, so long as the associated circuitry in the electronics sled is correspondingly designed to support the desired number of PMTs and identically process their outputs.

According to one embodiment of the present invention, the PMTs 260 use positive high voltage up to and including 1500 VDC. As understood in the art, this voltage level depends on the types of PMTs 260 used. The centroid of the photopeak caused by Cs-137 (662 keV) gamma-rays in each PMT is adjusted to have an output signal level of approximately 4.5 fC (femto-Coulomb). A gain adjusting potentiometer can be designed and built into the PMT circuit (as part of the associated circuitry in the electronics sled 280 at one end of the block detector 220), and/or the high-voltage can be adjusted to achieve the desired gain. The PMT current divider string of the requisite voltage divider circuit for each PMT 260 can be housed integral to the PMT structure. A plate of light-blocking material, such as PCB (Printed Circuit Board) or any similar material, can provide a light-tight barrier between the PMT volume and the remainder of the block detector volume in any manner practiced in the art. PMT high voltage/signal paths and current return may be passed through a connector, which is firmly mounted on the barrier plate or in any other manner practiced in the art, to the electronics sled 280. The PMT volume can also be surrounded by a magnetic shielding material, such as mu-metal (due to the sensitivity of PMTs).

Figure 3:
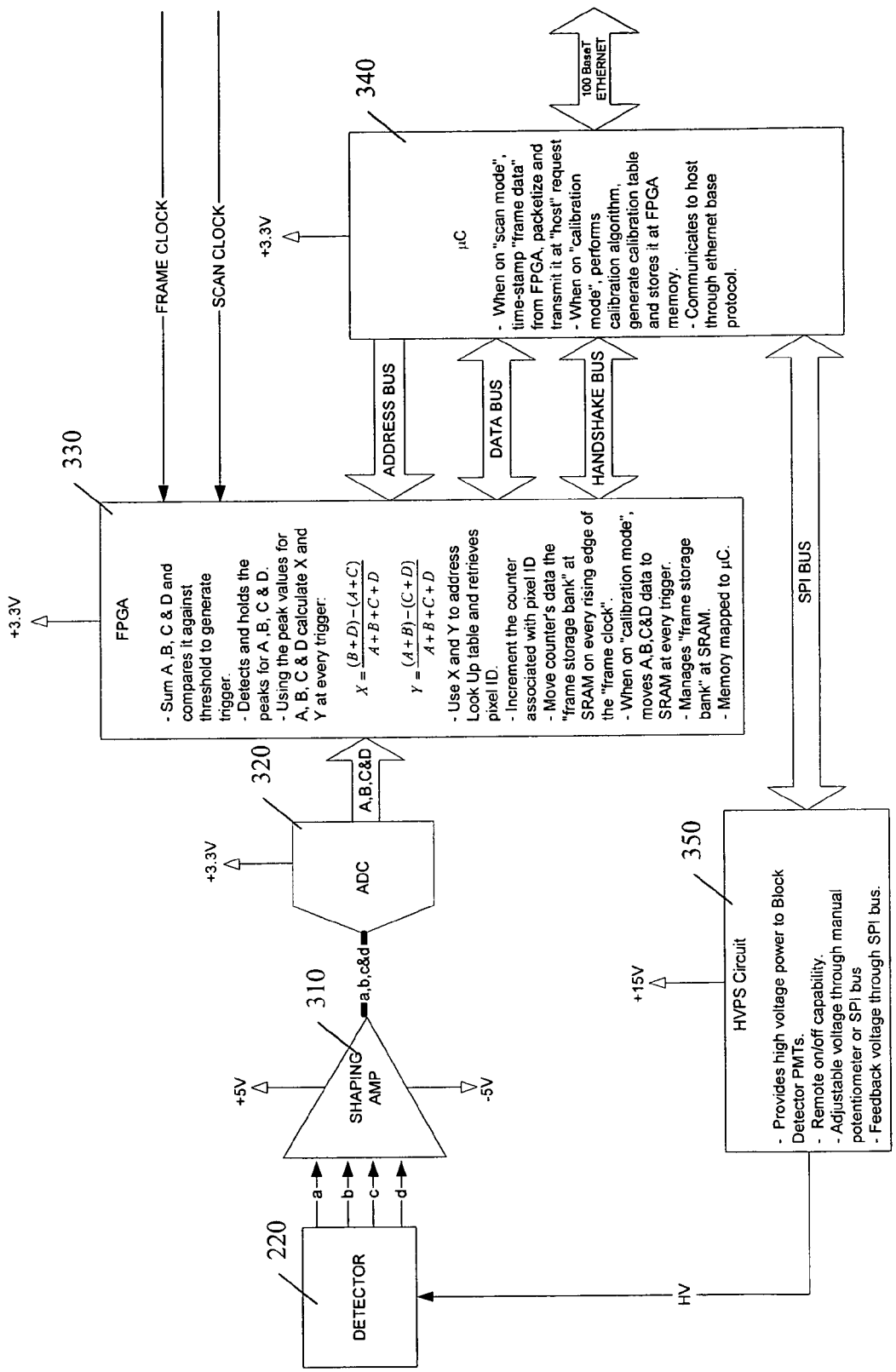
FIG. 3 depicts the associated circuitry in each block detector in accordance with an embodiment of the present invention.

FIG. 3 depicts the associated circuitry in the electronics sled 280 of each block detector 220. The associated circuitry includes a shaping amplifier 310, an ADC (analog-to-digital converter) 320, a FPGA (field programmable gate array) 330, and a microcontroller 340. Each of these components is described below.

The shaping amplifier 310 represents a plurality of amplifiers for shaping the incoming PMT signals from the PMT outputs. There is one amplifier for each PMT output channel; thus, in the embodiment shown with four PMTs 260, there are four amplifiers represented by the shaping amplifier 310, each is responsible for changing the timing and amplitude of the electronic signal from each PMT output so that the signal is suitable for input to the ADC 320, as understood in the art.

The ADC 320 is used to digitize the four amplified analog output channels from the four amplifiers represented by the shaping amplifier 310 at a rate of up to 40 MHz, in accordance with one embodiment of the present invention. The digital sampling rate can be any value, preferably from 10 MHz to 60 MHz, and represents a trade-off between high-resolution analog-to-digital conversion and processing cost and thermal problems associated with high sampling rates.

The FPGA 330 processes the four digitized PMT channels, as output from the ADC 320, to decode the affected pixel and count events per pixels over each predetermined frame period. Such information is then buffered in a RAM (random access memory), which may be part of or separate from the circuitry of the FPGA 330. Particularly, in the embodiment shown in FIG. 3, the FPGA 330 processes the four digitized PMT channels by running the channels through a weighted average whereby: the four digitized PMT channels (A, B, C, D) are summed, and the sum is compared against a predetermined threshold to generate a trigger; the peaks of the four channels (A, B, C, D) are then detected and held; and a coordinate (X, Y) for an event location (i.e., the gamma-ray/photon interaction location) is then defined using the peak values for A, B, C, and D at every trigger based on the following equations:

$$X=((B+D)-(A+C))/(A+B+C+D); \text{ and}$$

$$Y=((A+B)-(C+D))/(A+B+C+D).$$

The FPGA 330 can be programmed with software application, which can be written in any suitable computer programming code such as Verilog and VHDL, to perform the aforementioned tasks. The software application is also used to access a calibration look-up table (pixelLUT) to determine which discrete detector pixel 242 in the pixel array 240 corresponds to the calculated event location (X, Y). Thus, the pixelLUT is used to compensate for the different optical characteristics of the detector pixel 242 due to the different material or type of crystal that may be used for the detector pixel 242 by linearizing the nonlinear signals (A, B, C, D) received from the PMTs and identifying the actual physical detector pixel 242 for the event location.

The pixelLUT can be empirically derived based on the physical and optical characteristics of the block detector 220 and each detector pixel 242 therein, as understood in the art. The pixelLUT can be stored in a non-volatile memory device, e.g., an EEPROM, that may be part of or separate from the FPGA 330. In a preferred embodiment, the pixelLUT is first stored in a non-volatile flash memory area of the microcontroller 340 (to be described later) and then transferred into a RAM of the FPGA 330 once the block detector 220 is powered up.

The software application for the FPGA 330 can also access and increment a counter, e.g., a software-coded counter, associated with each discrete pixel 242 corresponding to an event location ("pixel ID") as determined from the pixelLUT. Each of the 64 counters corresponding to the 64 discrete pixels 242 in the block detector 220 is incremented as needed to indicate an event location in a predetermined frame period, as stated earlier. The event memory data of the event locations, including the corresponding discrete detector pixels 242 counters to indicate the physical discrete detectors 242 of the event locations, is then buffered in a RAM, as also stated earlier, for each frame period as described in FIG. 3.

Figure 2:
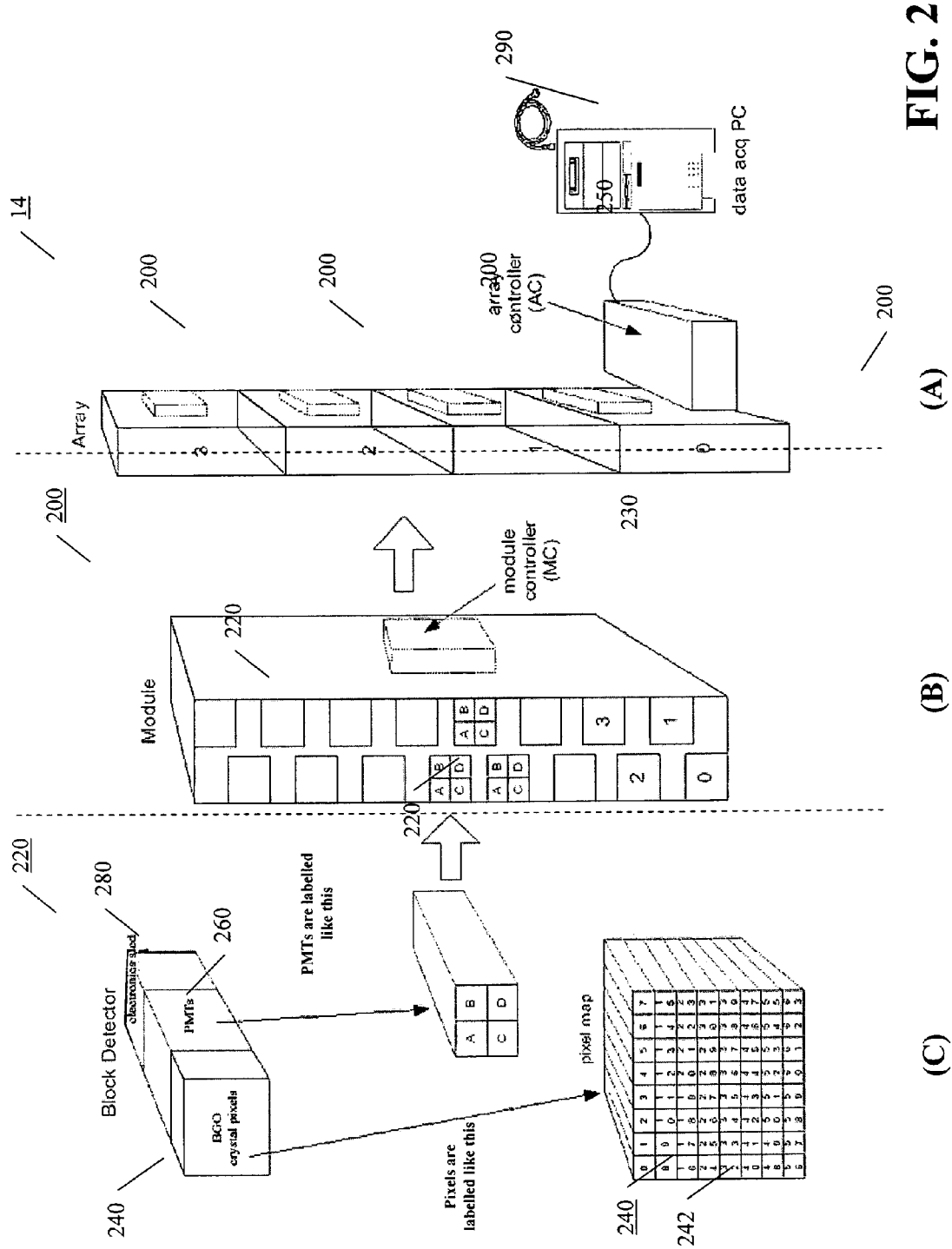
FIGS. 2A-C depict a detector array that comprises detector modules of block detectors in accordance with an embodiment of the present invention.

The microcontroller 340 then retrieves the event memory data for each frame period from the RAM and transfers it to a host computer, e.g., the data acquisition computer 290, via a communication device such as an Ethernet 100BaseT shown in FIG. 2, as described in FIG. 3.

The high voltage power system (HVPS) circuit 350 provides the requisite high voltage to the block detector 220 (for the PMTs 260) as described in FIG. 3 and reference in FIG. 4 as described below.

Figure 4:
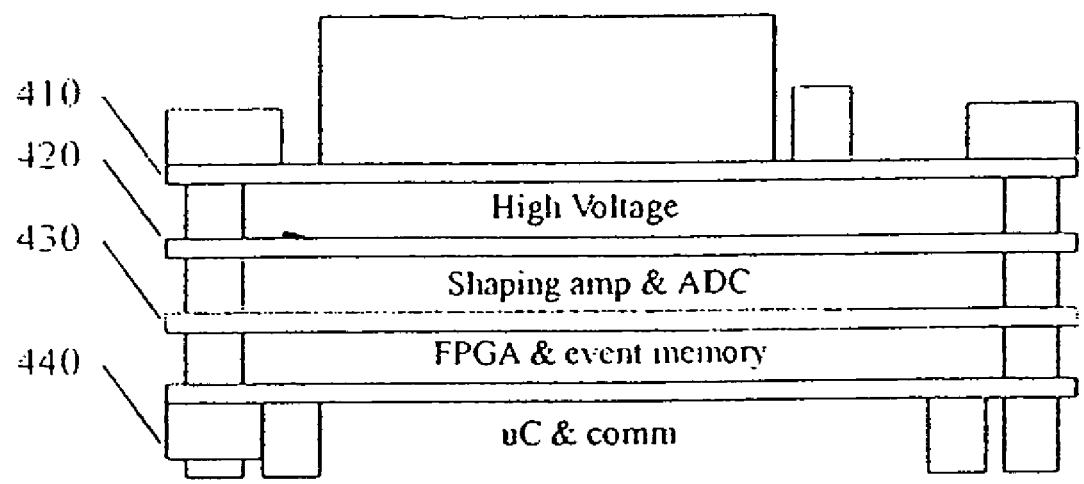
FIG. 4 depicts an implementation of the associated circuitry shown in FIG. 3 in accordance with an embodiment of the present invention.

FIG. 4 depicts, in accordance with one embodiment of the present invention, an implementation of the associated circuitry shown in FIG. 3 as a plurality of stacked PCBs, namely: a high-voltage PCB 410, a shaping amp & ADC PCB 420, an FPGA 430, and a microcontroller PCB 440. The high-voltage PCB 410 houses the HVPS circuit 350 to provide conversion of low input voltage, e.g., 15 VDC, to high voltage, e.g., 0 through 1500 VDC, required to operate the PMTs 260. As the name implies, the shaping amp & ADC PCB 420 houses the shaping amplifier 310 and ADC 320 as described earlier; whereas, the FPGA and PCB 430 houses the FPGA 330 and any desired memory devices as also described earlier.

Figure 5A:
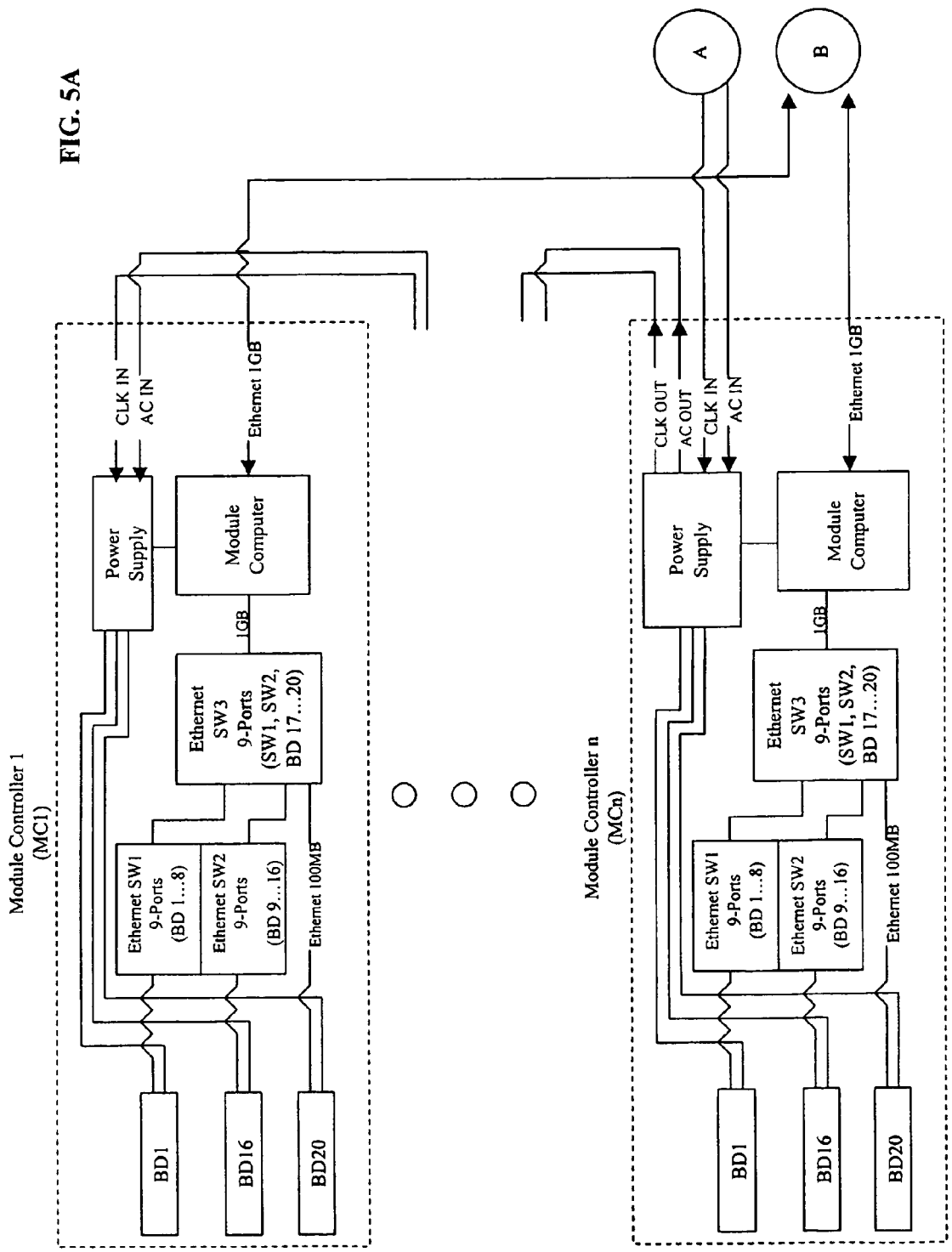
FIG. 5 depicts a schematic diagram for the module controller 230 and array controller 250 shown in FIG. 2, in accordance with an embodiment of the present invention.
Figure 5B:
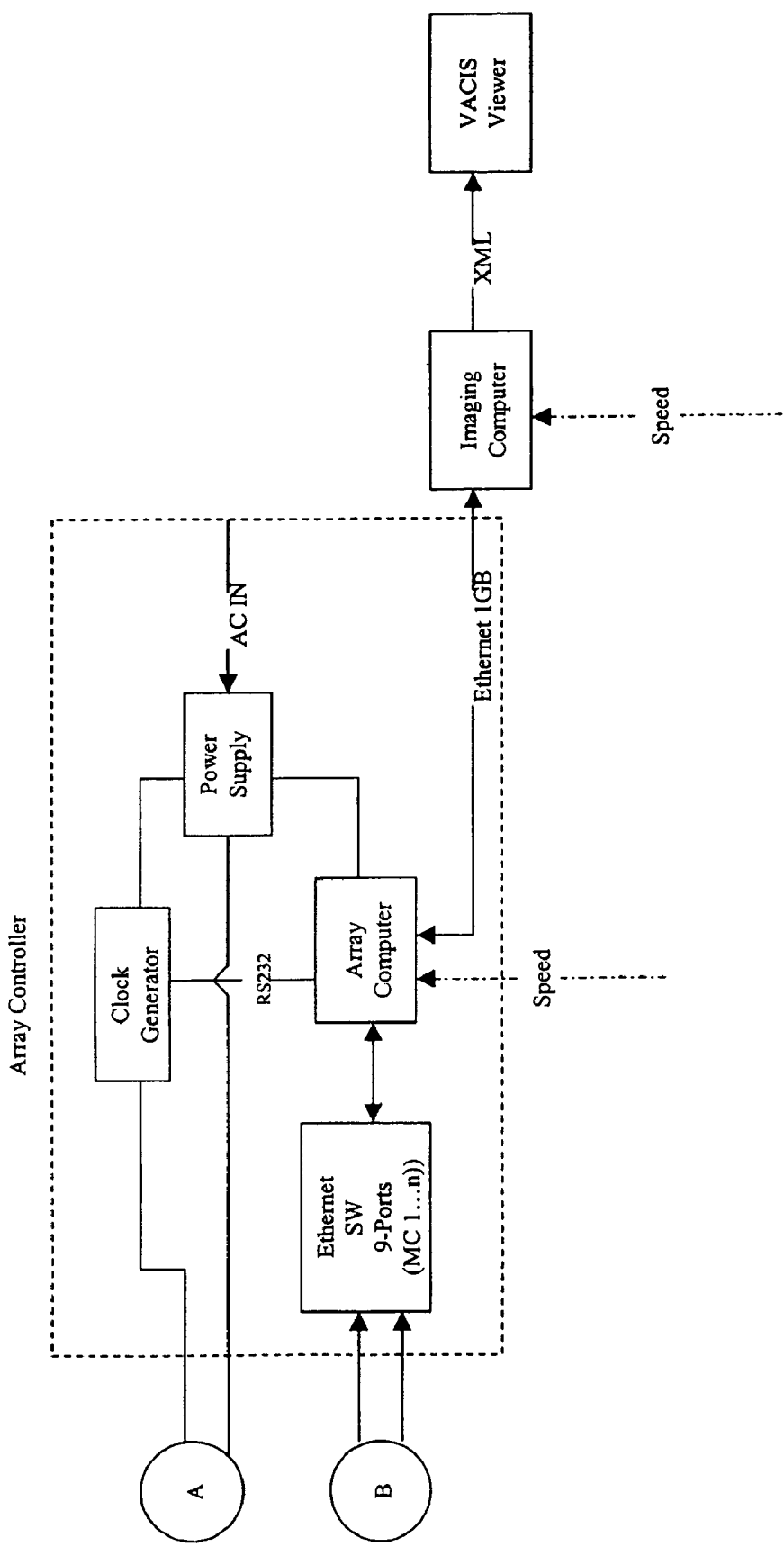

FIG. 5 depicts a schematic diagram for the module controller 230 and array controller 250 shown in FIG. 2, in accordance with an embodiment of the present invention. The module controller 230 supports the block detectors 220 in each block module 200 by accepting the event memory data output from all the block detectors 220 in each block module 200, buffering and formatting the data in a more efficient manner for transport, and making the formatted data available to the array controller 250 and onward to the host computer 290 as requested. The module controller 230 also acts as a power distribution point to distribute low voltage DC to the block detectors 220 in each block module 200. The array controller requests the event memory data as needed for processing by the host computer 290. The array controller can be a part of or separate from the host computer 290. Hence, the array controller 250 and host computer 290 represent the electronics 22 shown in FIG. 1. The schematic diagram in FIG. 5 is self-explanatory to one skilled in the art, with BD1 . . . B20 denote block detectors, and therefore further explanation of the figure is not made herein.

The host computer 290, shown as a data acquisition computer, can be any computer having any number of computer processors (e.g., processors from Intel Corporation of Santa Clara, Calif. and Motorola Corporation of Schaumburg, Ill.) and operating programmatically under the control of a software system. As mentioned above, the host computer 290 receives the event memory data via the array controller in response to the detection of individual photons by the detector array 14. The software system then processes the event memory data of the event locations, including the corresponding discrete detectors 242 for the event locations, and generates a radio graphic, image-like display output signal in response thereto. The radio graphic, image-like display output signal is coupled to a graphical display device, such as a television or computer monitor (CRT, LCD, plasma, DLP, LCOS, etc.), and is used by the graphical display device to generate a graphical representation of the densities within the vehicle, cargo container, or other target object under inspection.

The detector array truck 16 and the radiation source truck 20 are designed to travel synchronously along parallel tracks. The trucks 16, 20, the tracks, a synchronous drive motor and a variable frequency generator for controlling the speed of the synchronous drive motors are available as Model No. SA0100 from Becker Equipment (Maakh Becker P.E.) of Vista, Calif., however, numerous known substitutes can be employed.

In operation, the trucks 16, 20 are moved synchronously along parallel paths spanning the entire length of the tanker truck or the railroad car to be inspected by the synchronous drive motors. Alternatively, and preferably, the truck or railroad car being inspected can be driven between the detector array 14 and the radiation source 18, which in such alternative are both stationarily mounted, wherein the speed or velocity of the truck or railroad car is detected and forwarded to the host computer 290 for electronic binning as described later.

The configuration of the block detectors 220 in the detector array 14 is made to provide a resolution of grid points (detector pixels) spaced about every 6 mm along the length of the target vehicle and about 6 mm along the height of the target vehicle (as projected on the target vehicle vertical center plane, running lengthwise). This is achieved by electronically binning the data during continuous scanning motion. As understood in the art, electronic binning involves tracking or detecting the velocity of the object to be scanned or inspected, perform a curve fitting of the counts to the detected velocity, and redistributing the counts for event locations by modifying the frame period in accordance with the curve-fitted, detected velocity to achieve the aforementioned grid point resolution. This resolution is adequate to achieve a detectability limit of less than half a kilogram of contraband per 6 mm by 6 mm grid point (or detector pixel). The grid size can easily be varied by appropriately selecting the distance between the radiation source 18 and the block detectors 220. The electronic binning can be implemented via the aforementioned software system in the host computer 290.

Preferably, the entire length of the tanker truck or railroad car is scanned automatically, in a single sweep. In order to accomplish automatic scanning in the truck-mounted embodiment shown, the detector array truck 16 and the radiation source truck 20 are moved in a parallel fashion along the tracks at a detected speed, with a counting interval selected to effect a longitudinal pixel length (i.e., grid-spacing interval) of 6 mm for a typical tanker truck inspection. This grid size, as mentioned above, can easily be selected by one skilled in the art based on the disclosure provided herein and dependent upon an optimum tradeoff between minimum contraband content detectability, throughput (i.e., inspection time per tanker truck), gamma-ray field-strength (and other safety considerations), and overall system cost.

As mentioned above, if a sufficiently high field-strength is utilized, the detector array 14 and the radiation source 18 may be fixed or stationary rather than mounted on the radiation source truck 20 and the detector array truck 16. In such an arrangement, the tanker truck 10 or railroad car can be driven past the detector array 14 and radiation source 18 with the determination as to the densities within the tanker truck 10 being made automatically as the tanker truck 10 passes between the radiation source 14 and the detector array 18. In this stationary mode the speed of the target vehicle is measure by a speed sensor, such as a radar gun, and fed back to the system for electronic binning as described earlier to effect the desired grid point resolution of 6 mm.

Thus, in the embodiment shown in FIG. 1 and in the preferred embodiments, a truly non-invasive inspection technique is provided in which there is no need to evacuate the vehicle to be inspected, or, in the preferred embodiment, to even stop or slow down the vehicle in order to effect inspection of such vehicle.

As mentioned earlier, the need for high system sensitivity requires spreading the detector mass across a broader width, e.g., in a checker-board pattern shown in FIG. 2 (or any other pattern wherein the block detectors are spread along the longitudinal length or traveling direction of the target vehicle), than otherwise desired. This induces a parallax effect, which, left uncorrected, can remove any improvement in imaging performance. The parallax effect is produced from the spreading of the individual detector pixels 242 longitudinally across each block detector and from one detector to another. Accordingly, in one embodiment of the present invention, the process for correcting such parallax effect and maximizing the imaging improvement may be software implemented to comprise an adaptation of algebraic reconstruction technique (ART), which is well known to those skilled in the art, and can be implemented by the software system in the host computer 290, shown as the data acquisition PC 290 in FIG. 2. The ART technique basically maps the system geometry, uses the observed (raw) data (from the event memory data received) as the first guess, then estimates what the real object looked like in order to yield that data. The process iterates several times until the estimated object density closely matches the observed data. Other known techniques, such as Radon transforms, frequency-domain filtering, can also be used to generate the process. Such known techniques have been well developed in other industries like medical imaging and non-destructive testing.

Thus far, embodiments of the present invention have been described with reference to a non-moving target, e.g., the non-moving truck 10 shown in FIG. 1. However, it should be understood to one of ordinary skill in the art that such embodiments are equally applicable in imaging moving targets, including fast-moving targets. As described in U.S. patent application Ser. Nos. 10/833,131, 10/717,632, and 09/925,009, all incorporated herein by reference in their entireties, a velocity measuring system disclosed therein can be added to the detection system shown in FIG. 1 to compensate for the velocity of moving targets and adjust the count distribution accordingly to produce an undistorted image maintain spatial resolution and high system sensitivity.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

The invention claimed is:

1. A method for imaging a target comprising:
   directing radiation at the target;
   detecting at least a portion of the radiation that passes through the target at a detector array that includes at least one block detector having a two-dimensional sub-array of discrete detectors including multiple pixels and four photomultiplier tubes PMTs in a 2×2 array referenced individually as A, B, C and D and each of the four PMTs receives radiation from each of the multiple pixels;
   converting the detected radiation into multiple light signals using at least one scintillator;
   multiplying the multiple light signals using at least one photomultiplier tubes (PMT);
   shaping the multiplied light signals using at least one shaping amplifier;
   digitizing the shaped light signals using at least one analog-to-digital converter;
   processing the at least one digitized light signal to generate a density image of the target that is corrected for a parallax effect resulting from a configuration of the detector array;
   determining a trigger event by:
   collecting digitized light signals over a predetermined period of time;
   summing the digitized light signals collected;
   comparing the sum to a predetermined threshold;
   determining a trigger event if the sum is above the predetermined threshold; and
   detecting and holding a peak value for each of A, B, C and D for each determined trigger event.

2. The method of claim 1 further comprising, utilizing at least one field programmable gate array to process the digitized light signals.

3. The method of claim 1, the ratio of PMTs to shaping amplifiers is 1:1.

4. A method for imaging a target comprising:
   directing radiation at the target;
   detecting at least a portion of the radiation that passes through the target at a detector array that includes at least one block detector having a two-dimensional sub-array of discrete detectors including multiple pixels and four photomultiplier tubes PMTs in a 2×2 array referenced individually as A, B, C and D and each of the four PMTs receives radiation from each of the multiple pixels;
converting the detected radiation into at least one light signal;
multiplying the at least one light signal;
shaping the at least one multiplied light signal;
digitizing the at least one shaped light signal;
processing the at least one digitized light signal to generate a density image of the target;
determining a trigger event by:
collecting digitized light signals over a predetermined period of time;
summing the digitized light signals collected;
comparing the sum to a predetermined threshold;
determining a trigger event if the sum is above the predetermined threshold; and
detecting and holding a peak value for each of A, B, C and D for each determined trigger event.

5. The method of claim 4 further comprising, defining an (X, Y) pixel location of the trigger event based on the following equations:

$$X=((B+D)-(A+C))/(A+B+C+D); \text{ and}$$

$$Y=((A+B)-(C+D))/(A+B+C+D).$$

6. The method of claim 5, converting radiation received at each of the multiple pixels into light signals is accomplished with at least one scintillator.

7. The method of claim 5, shaping the light signals is accomplished with at least one shaping amplifier.

8. The method of claim 5, digitizing the light signals is accomplished with at least one analog-to-digital converter.

9. The method of claim 5, summing the digitized light signals collected is accomplished with at least one field programmable gate array (FPGA).

10. A method for imaging a target comprising:
directing radiation at the target;
detecting at least a portion of the radiation that passes through the target at a detector array including at least one block detector having a two-dimensional sub-array of discrete detectors, the two-dimensional sub-array of discrete detectors including multiple pixels;
converting radiation received at each of the multiple pixels into light signals;
multiplying the light signals at four PMTs in a 2×2 array referenced individually as A, B, C and D;
shaping the light signals;
digitizing the light signals;
collecting the digitized light signals over a predetermined period of time;
summing the digitized light signals collected;
comparing the sum to a predetermined threshold;
determining a trigger event if the sum is above the predetermined threshold; and
detecting and holding a peak value for each of A, B, C and D for each determined trigger event.

11. The method of claim 10 further comprising, defining an (X, Y) pixel location of the trigger event based on the following equations:

$$X=((B+D)-(A+C))/(A+B+C+D); \text{ and}$$

$$Y=((A+B)-(C+D))/(A+B+C+D).$$

* * * * *